United States Patent
Hofacker et al.

(10) Patent No.: US 7,317,121 B2
(45) Date of Patent: *Jan. 8, 2008

(54) PREPARATION OF ALIPHATIC OLIGOCARBONATE POLYOLS

(75) Inventors: Steffen Hofacker, Odenthal (DE); Herbert Witossek, Leipzig (DE); Lothar Bäcker, Gossa (DE)

(73) Assignee: Bayer MaterialScience AG, Leverkusen (DE)

(*) Notice: Subject to any disclaimer, the term of this patent is extended or adjusted under 35 U.S.C. 154(b) by 372 days.

This patent is subject to a terminal disclaimer.

(21) Appl. No.: 10/941,656

(22) Filed: Sep. 15, 2004

(65) Prior Publication Data

US 2005/0065359 A1    Mar. 24, 2005

(30) Foreign Application Priority Data

Sep. 19, 2003   (DE) ................... 103 43 472

(51) Int. Cl.
*C07C 68/06* (2006.01)
*C07C 68/00* (2006.01)
(52) U.S. Cl. ..................................... 558/276
(58) Field of Classification Search ................ 558/276
See application file for complete search history.

(56) References Cited

U.S. PATENT DOCUMENTS

| 6,833,433 B1 | 12/2004 | Schlemenat et al. ........ 528/425 |
| 2003/0009047 A1 | 1/2003 | Tillack et al. ................ 558/265 |
| 2004/0143130 A1 | 7/2004 | Tillack et al. ................ 558/265 |

*Primary Examiner*—Elvis O. Price
(74) *Attorney, Agent, or Firm*—Lyndanne M. Whalen; John E. Mrozinski, Jr.

(57) ABSTRACT

The present invention relates to an improved process for preparing aliphatic oligocarbonate polyols by transesterifying dimethyl carbonate (DMC) with an aliphatic polyol component.

5 Claims, No Drawings

PREPARATION OF ALIPHATIC OLIGOCARBONATE POLYOLS

FIELD OF THE INVENTION

The present invention relates to an improved process for preparing aliphatic oligocarbonate polyols by transesterifying dimethyl carbonate (DMC) with an aliphatic polyol component.

BACKGROUND OF THE INVENTION

Oligocarbonate polyols can in principle be prepared from aliphatic polyols by reacting with phosgene, bischlorocarbonic esters, diaryl carbonates, cyclic carbonates or dialkyl carbonates. Such polyols are important precursors for producing plastics, paints and adhesives. They are reacted, for example, with isocyanates, epoxides, (cyclic) esters, acids or acid anhydrides.

DE-A 101 30 882 describes a two-stage process for preparing oligocarbonate diols, in which dimethyl carbonate (DMC) is first reacted with one or more aliphatic diols at a pressure of 1.5 to 100 bar and a temperature of 100° C. to 300° C., in the course of which the methanol formed in the reaction is removed from the reaction together with DMC as a mixture. In the second step, the terminal hydroxyl groups are decapped by applying pressures of 1 to 1000 mbar and temperatures of 160° C. to 250° C. for several hours. The preferred reaction temperature for the decapping step is 200° C. and the pressure 100 to 200 mbar. Depending on the variant, the residence time of the reaction mixture at 200° C. is between 9 and 50 hours. The thus prepared oligocarbonate diols, at a number-average molecular weight $M_n$ of 2000 g/mol, have an OH number (OHN) of about 56 mg KOH/g. However, the actual OH functionality of the thus obtained products deviates from the theoretical value of 2.00. The reason for this is the formation of by-products having undesired end groups which lower the functionality, for example methyl ester, methyl ether, vinyl groups and others.

In many subsequent applications in which oligocarbonate polyols are used, it is not only the OHN but also the actual OH functionality ($f_{OH}$) and in particular their consistency which are of particular significance. When the functionality deviates by more than 0.10 from the theoretical value (for example 2.00 for oligocarbonate diols), this leads, as a consequence of the fractions of monofunctional oligocarbonates which function as chain terminators in polymerization reactions, to materials having distinctly worsened mechanical properties. It is therefore necessary, in addition to the classical characteristic parameters such as viscosity, OHN, color number, etc., in particular to keep the actual OH functionality constant and close to the theoretical value of, for example, 2.00 for bifunctional oligocarbonate polyols.

Moreover, the transesterification catalysts described in DE-A 101 30 882 have a high activity towards compounds containing isocyanate groups in the further reaction of the oligocarbonate diols as a polyurethane raw material. This property is particularly marked when aromatic (poly)isocyanates are reacted at elevated temperature with oligocarbonate polyols which have been prepared with titanium transesterification catalysts, as is the case, for example, in the preparation of cast elastomers or thermoplastic polyurethanes (TPU). This may lead to the pot life or reaction time of the reaction mixture being shortened to such an extent that it is no longer possible to use such oligocarbonate polyols for these fields of application. In order to prevent this, the transesterification catalyst remaining in the product on completion of synthesis is very substantially deactivated in at least one additional production step. However, in particularly sensitive fields of application, even this deactivation is not sufficient to obtain adequately long pot lives or reaction times.

DETAILED DESCRIPTION OF THE INVENTION

The present invention will now be described for purposes of illustration and not limitation. Except in the operating examples, or where otherwise indicated, all numbers expressing quantities, percentages and so forth in the specification are to be understood as being modified in all instances by the term "about."

It has now been found that a multistage transesterification at temperatures of $\leq 170°$ C. in the presence of ytterbium compounds as transesterification catalysts allows oligocarbonate polyols to be obtained which no longer have these disadvantages.

The present invention provides a process for preparing oligocarbonate polyols, in which, in a first step A), dimethyl carbonate is reacted with a polyol component, which may be an aliphatic polyol or a mixture of aliphatic polyols or a mixture of aliphatic polyols with lactones, with the addition of an ytterbium compound as the transesterification catalyst, at pressures of atmospheric pressure to 6 bar and temperatures of 100 to 170° C., preferably 100 to 160° C., more preferably 110 to 155° C., and step A) involves $n \geq 2$ successive substeps $A_i$) where i takes values of 1 to n, and, in each substep $A_i$), a pressure $^1p_i$ of 3 to 6 bar (absolute) is established in the reactor, a portion $x_i$ of the total amount of dimethyl carbonate is added to the liquid phase of the reaction mixture and, after a reaction time $t_i$ of 30 minutes to three hours, preferably 30 minutes to 2 hours, more preferably 45 minutes to 90 minutes, at a temperature $T_i$, the methanol formed in the reaction is removed from the reaction mixture by distillation in the form of a gaseous methanol/dimethyl carbonate mixture, in the course of which the pressure is reduced, at constant temperature $T_i$, within 2 to 10 hours, preferably 3 to 8 hours, more preferably 4 to 6 hours, from $^1p_i$ to a pressure $^2p_i$ of 1 to 3 bar (absolute), and, in the last substep $A_n$), the portion $x_n$ still absent from the total amount is added and the pressure $^2p_n$ at the end of the substep is atmospheric pressure; and subsequently, in a second step B), the pressure is reduced further and, after a pressure of $\leq 100$ mbar has been attained, an inert gas stream is passed into the reaction mixture, in the course of which further methanol/dimethyl carbonate mixture is distilled off in parallel, and in the course of which the temperature of the reaction mixture does not exceed a value of 195° C., preferably 190° C.

The first step A) of the process according to the present invention involves a sequence of substeps $A_i$). n substeps are carried out and n takes a value of at least 2. In a preferred embodiment of the invention, the process step A) involves three substeps $A_1$), $A_2$) and $A_3$). In each substep $A_i$), a portion $x_i$ of the total amount of DMC is added to the reaction mixture, so that, after the last substep $A_n$) in which the portion $x_n$ is added, the total amount of DMC has been added to the reaction mixture. At the start of each substep, a constant pressure $^1p_i$ in the range of 3 to 6 bar (absolute) is set, preferably by introducing inert gas. The reaction mixture is heated at a temperature $T_i$ in the range of 100° C. to 170° C. for a reaction time $t_i$, then the methanol formed in the reaction is removed from the reaction mixture by distillation in the form of a gaseous methanol/dimethyl carbonate mixture, in the course of which the pressure of $^1p_i$ is reduced, at constant temperature $T_i$, within 4 to 6 hours, to a pressure $^2p_i$ in the range of 1 to 3 bar (absolute). Usually, after the pressure $^2p_i$ has been attained, the distillation is continued for another 30 to 120 minutes. Subsequently, the next substep $A_{i+1}$) is commenced, for which the distillation is preferably interrupted. Each substep may be carried out at another temperature $T_i$ and other pressures $^1p_i$ and $^2p_i$, and different reaction times $t_i$ may be selected. However, the same reaction conditions are frequently selected for a plurality of substeps. At the end of the last substep $A_n$), atmospheric pressure is established in the reactor, i.e. $^2p_n$ is 1013 mbar.

The additional demand for DMC as a consequence of the distillation loss during the transesterification phase is 5 to 50%, based on the amount required by the stoichiometry. The stepwise addition of DMC, the use of ytterbium compounds as transesterification catalysts and the thus possible low reaction temperatures of not more than 170° C. ensure not only a high space-time yield, but also that the by-production of methyl ether end groups can be greatly reduced or prevented, which contributes to an increase in the OH functionality.

It is essential to the present invention that the DMC concentration in the reaction mixture is adjusted in such a way that, on the one hand, the by-production and the DMC excess required are minimized, and, on the other hand, the space-time yield is not impaired. This is preferably effected by keeping the pressure and the temperature constant, which (depending on the temperature) establishes a certain partial pressure of the dimethyl carbonate. The total pressure is preferably built up by introducing inert gas into the reactor. It is important that the DMC is added in such a way that the autogenous pressure of the DMC which is established does not exceed the predetermined total pressure.

Care thus has to be taken that the portions $x_i$, the temperatures $T_i$ and reactor pressures $^1p_i$ are balanced with respect to one another. This ensures both that the by-production is greatly reduced and the required stoichiometric excess of DMC can be minimized.

In the second inventive process step (decapping), the pressure is reduced further and the temperature of the reaction mixture takes values of $\leq 195°$ C., preferably $\leq 190°$ C. When a pressure of $\leq 100$ mbar is attained, an inert gas stream is introduced into the reaction mixture. In addition to the vacuum conditions, this has the effect of additionally entraining out methanol which has formed or DMC which is still present. This procedure promotes the formation of additional terminal hydroxyl groups, which contributes to an increase in the OH functionality and thus to improved product quality.

Inert gases used are those which do not intervene in the chemical process. Examples are nitrogen, argon, methane and natural gas. Preference is given to using nitrogen.

A significant feature of the decapping step is the temperature control of this phase. When the reaction temperature is raised to more than 195° C., there is an increased extent of by-production. This results substantially in terminal vinyl groups which lead to a drastic reduction in the OH functionality. It is therefore essential for the process according to the invention to set the temperature during the decapping phase to values of $\leq 195°$ C., preferably $\leq 190°$ C. This allows the formation of terminal vinyl groups to be prevented and thus the OH functionality to be increased.

After a hold time between 10 and 50 hours at a pressure of $\leq 100$ mbar and a temperature of $\leq 195°$ C., preferably $\leq 190°$ C., the pressure is increased to atmospheric pressure by aerating with inert gas, preferably nitrogen. Subsequently, product properties such as OH number, viscosity, number-average molecular weight, OH functionality, etc. can be determined.

When the number-average molecular weight of the products is too high after the decapping phase, it is corrected by adding appropriate amounts of polyol and/or polyol mixture and reheating the reaction mixture to a temperature of 100 to 170° C. (similarly to the first process step) for one to five hours. There is not necessarily any need for a new decapping step after this correction, as long as all terminal OH groups were already in free form before the correction and no recapping of the terminal hydroxyl groups is built up by adding the polyol component.

When the number-average molecular weight of the product after the decapping phase is too low, it is corrected by adding appropriate amounts of DMC and reheating the reaction mixture to a temperature of 100 to 170° C. (similarly to the first process step) for one to five hours. Since this procedure leads to a new build-up of capping, a new decapping step (similarly to the second process step) follows. However, the run times of the new decapping can be greatly reduced as a consequence of the comparatively small corrective amount of DMC added. However, it is essential here too to control the temperature in a similar manner to the above-described second process step.

The transesterification catalysts used in the process according to the present invention include ytterbium compounds or mixtures thereof. Examples are ytterbium(III) heptadionate, ytterbium(III) acetylacetonate and ytterbium (III) chloride. Preference is given to ytterbium(III) acetylacetonate.

The catalyst contents used are 0.01 to 1000 ppm, preferably 0.1 to 500 ppm, more preferably 1 to 200 ppm, based on the total amount of the oligocarbonate polyol prepared. Deactivation of the catalyst can be dispensed with. There is no need for any subsequent masking, precipitation or other removal or deactivation.

In the process according to the invention, a polyol component is used which is an aliphatic polyol or a mixture of aliphatic polyols or a mixture of aliphatic polyols with lactones.

It is possible to use aliphatic polyols having 4 to 50 carbon atoms in the chain (branched or unbranched) which may also be interrupted by additional hetero atoms such as oxygen (O), sulphur (S) or nitrogen (N). Examples of suitable diols are 1,4-butanediol, 1,5-pentanediol, 1,6-hexanediol, 1,7-heptanediol, 1,12-dodecanediol, cyclohexanedimethanol, 3-methyl-1,5-pentanediol, 2,4-diethyl-1,5-pentanediol, trimethylolpropane, pentaerythritol, bis(2-hydroxyethyl) ether, bis(6-hydroxyhexyl) ether, diols prepared by reducing dimerized unsaturated fatty acids ("dimer diols"), short-chain $C_2$ or $C_3$ polyether diols having a number-average molecular weight of <500 g/mol or short-chain $C_4$ polyether diols having a number-average molecular weight of <700 g/mol, and also mixtures thereof.

The addition products of the polyols with lactones (ester polyols), for example $\epsilon$-caprolactone, valerolactone, etc., and also mixtures of the polyols with lactones, may also be used, in which case there no need for any initial transesterification of lactone and polyol.

In the process according to the present invention, preference is given to using mixtures of 1,6-hexanediol and/or 1,5-pentanediol and/or 1,4-butanediol, 1,12-dodecanediol and/or cyclohexanedimethanol. Particular preference is given to 1,6-hexanediol, 1,5-pentanediol or 1,4-butanediol, very particular preference to 1,6-hexanediol.

The process according to the invention enables the preparation of oligocarbonate polyols, oligocarbonate ester polyols, oligocarbonate ether polyols or mixtures thereof having number-average molecular weights of 500 to 5000 g/mol, preferably 500 to 2000 g/mol, and a residual content of methanol and DMC of in each case <0.10 mol %, preferably <0.05 mol %, and contents of terminal vinyl groups of <0.10 mol %, preferably <0.05 mol %, and terminal methyl ether groups of <3.0 mol %, preferably <2.5 mol %. The mol % contents specified may be regarded as fractions of the compound described based on 1 mole of the theoretical target compound having two terminal hydroxyl groups.

When oligocarbonate diols are prepared, their OH functionality is 1.85 to 2.00, preferably 1.90 to 2.00, more preferably 1.95 to 2.00.

The oligocarbonate polyols prepared by the process according to the invention may be reacted with isocyanates, epoxides, (cyclic) esters, acids or acid anhydrides and thus used, for example, to prepare polymers, plastics, fibers, coatings, paints and adhesives. Equally, the oligocarbonate polyols prepared in accordance with the invention may be used as constituents in polyurethane-based cast elastomer applications. They are also suitable as building blocks for moisture-hardening coatings, as binders or binder constituents and/or reactive diluents in solvent-borne or waterborne polyurethane coatings. They may also be used as building blocks for polyurethane prepolymers containing free NCO groups or in polyurethane dispersions or polyurethane solutions. The oligocarbonate polyols prepared by the process according to the invention may also be used to produce thermoplastics such as aliphatic and/or aromatic polycarbonates, thermoplastic polyurethanes, etc.

EXAMPLES

The contents, listed in the examples, of compounds which, unlike the theoretical target compound, bear only one or no terminal hydroxyl groups were determined by $^1$H NMR analysis and the integral evaluation of the appropriate signals, as was the number-average molecular weight. The contents reported in mol % may be regarded as fractions of the compound described based on 1 mole of the theoretical compound having two terminal hydroxyl groups. In the calculation of the OH functionality, the thus calculated values are interpreted as fractions of chain terminator molecules and taken into account appropriately.

Example 1

14,940 kg of 1,6-hexanediol, 5,292 kg of dimethyl carbonate and 3.6 kg of ytterbium(III) acetylacetonate were initially charged at 70° C. in a stirred reactor having a column and total condenser. Subsequently, the tank pressure was increased to 5.2 bar absolute by introducing nitrogen and controlled at a constant level, and the vessel contents were heated to 150° C. The reaction mixture was kept under reflux at 150° C. for 1 hour. Subsequently, the pressure was reduced at a constant temperature within 5 hours to 2.2 bar, and the resulting distillate containing methanol with fractions of dimethyl carbonate was discharged into a receiver. Afterwards, methanol/dimethyl carbonate mixture was distilled off at 2.2 bar for 1 hour. Subsequently, the pressure was increased again to 5.2 bar, and a further 5,292 kg of dimethyl carbonate were added. After 1 hour under reflux, the resulting distillate was again discharged at constant temperature while reducing the pressure to 2.2 bar within 5 hours. After 1 hour at 2.2 bar and 150° C., the temperature was reduced to 140° C. The pressure was increased to 4.2 bar with nitrogen and 3,699 kg of dimethyl carbonate were added. After 1 hour under reflux, the resulting distillate was finally discharged at constant temperature while reducing the pressure to atmospheric pressure (1.01 bar) within 5 hour.

To complete the reaction, the reactor pressure was then reduced to 90 mbar absolute. After 90 mbar had been attained, 4 m³/h of nitrogen were introduced into the reaction mixture via an immersed pipe in order to remove residual methanol; the vacuum was also reduced to approx. 30 mbar. After 4 hours, the reactor temperature was increased to 170° C., and to 190° C. after a further 4 hours. OHN and melt viscosity at 75° C. were measured every 4 hours. Subsequent additions of 280 kg, 200 kg and 65 kg of 1,6-hexanediol were used to correct the mixture. After a total decapping time of 40 hours at a pressure of <60 mbar and 190° C., the mixture was cooled to 90° C. and aerated with nitrogen to atmospheric pressure.

An oligocarbonate diol having the following characteristic data was obtained:

| | |
|---|---|
| Number-average molar mass: | 2,000 g/mol |
| OH number: | 54.3 mg KOH/g |
| Viscosity at 75° C.: | 2,620 mPas |
| Color number (APHA): | 37 hazen |
| OH functionality: | 1.96 |
| Content of terminal vinyl groups: | 0.0 mol % |
| Content of terminal methyl ether groups: | 1.3 mol % |

Comparative Example 1

415.1 kg of 1,6-hexanediol, 146.9 kg of DMC and 100 g of ytterbium(III) acetyl-acetonate were initially charged at 70° C. in a stirred reactor having a column and total condenser. After inertizing twice by applying vacuum and aerating with nitrogen, the pressure was increased to 5.2 bar (absolute) with nitrogen and controlled at a constant level by means of pressure control. Subsequently, the mixture was heated to 150° C. Once this temperature had been attained, the reaction mixture was kept under reflux for 2 hours. Afterwards, a mixture containing methanol and dimethyl carbonate was distilled off into a receiver for 2 hours. Subsequently, the pressure was reduced to 3 bar at a constant temperature of 150° C. within 4 hours and further distillate removed in this time. Finally, the pressure was increased again to 5.2 bar and a further 146.9 kg of dimethyl carbonate were added. At a constant temperature of 150° C., the reaction mixture was kept under reflux for 2 hours. Afterwards, a mixture containing methanol and dimethyl carbonate was again distilled off overhead into a receiver for 2 hours. Subsequently, the pressure was reduced at a constant temperature of 150° C. to 3 bar within 4 hours and to 2.5 bar within a further 8 hours; in this time, further distillate was removed. In a further transesterification cycle, the pressure was increased again to 5.2 bar, and a further 117.5 kg of dimethyl carbonate were added. The mixture was kept under reflux for 2 hours. Afterwards, a mixture containing methanol and dimethyl carbonate was again distilled off overhead into a receiver for 2 hours. Subsequently, the pressure was reduced to atmospheric pressure at a constant temperature of 150° C. within 7.5 hours and further distillate was removed in this time.

The temperature was increased to 180° C. and the pressure reduced to ≦80 mbar. At the same time, nitrogen (125 l/h) was introduced into the reaction mixture via a passage tube. After 18 hours at 180° C., the temperature was increased to 200° C. and retained for 40 hours. During this phase, the mixture was corrected using a subsequent addition of 8.4 kg of 1,6-hexanediol. After a total decapping time of 40 hours at 200° C. and a pressure of <60 mbar, the mixture was cooled to 90° C. and aerated to atmospheric pressure with nitrogen.

An oligocarbonate diol having the following characteristic data was obtained:

| | |
|---|---|
| Number-average molar mass: | 1,800 g/mol |
| OH number: | 58.7 mg KOH/g |
| Viscosity at 75° C.: | 2,200 mPas |
| Color number (APHA): | 138 hazen |
| OH functionality: | 1.88 |
| Content of terminal vinyl groups: | 3.3 mol % |
| Content of terminal methyl ether groups: | 1.5 mol % |

Comparative Example 2

8.7 kg of 1,6-hexanediol and 0.12 g of ytterbium(III) heptadionate were initially charged in a stirred reactor having a column and total condenser. After inertizing twice by applying vacuum and aerating with nitrogen, the pressure was increased to 5.2 bar (absolute) with nitrogen and the mixture was heated to 185° C. With the aid of a pressure control, the pressure was controlled at a constant level of 5.2 bar. After the temperature had been attained, 8.5 g of dimethyl carbonate were metered in via an immersed tube within 11 hours. At the same time, a distillate containing methanol and dimethyl carbonate was distilled off overhead into a receiver. After the end of the addition, stirring was continued at 185° C. for 2 hours.

At a temperature of 185° C., the pressure was initially reduced to atmospheric pressure and then further to approx. 60 mbar, in the course of which distillate was still distilled off overhead. Nitrogen (10 l/h) was then introduced into the reaction mixture via a passage tube. The mixture was stirred under these conditions for 10 hours. Subsequently, the mixture was aerated with nitrogen and corrected with a subsequent addition of 0.25 kg of 1,6-hexanediol, then stirred at 180° C. and a pressure of <60 mbar for a further 10 hours. Afterwards, the mixture was cooled to 100° C. and aerated to atmospheric pressure using nitrogen.

An oligocarbonate diol having the following characteristic data was obtained:

| | |
|---|---|
| Number-average molar mass: | 1750 g/mol |
| OH number: | 57.2 mg KOH/g |
| Viscosity at 75° C.: | 2200 mPas |
| Color number (APHA): | 126 hazen |
| OH functionality: | 1.78 |
| Content of terminal vinyl groups: | 0.0 mol % |
| Content of terminal methyl ether groups: | 10.9 mol % |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing oligocarbonate polyols, comprising
   A) reacting dimethyl carbonate with a polyol component, in the presence of an ytterbium compound transesterification catalyst, at pressures of atmospheric pressure to 6 bar and temperatures of between 100 to 170° C.,
      wherein step A) comprises $n \geqq 2$ successive substeps $A_i$) in which i takes values of 1 to n, and in each substep $A_i$), a pressure $^1p_i$ of between 3 to 6 bar is established in the reactor, a portion $x_i$ of the total amount of dimethyl carbonate is added to the liquid phase of the reaction mixture and, after a reaction time $t_i$ at a temperature $T_i$, the methanol formed in the reaction is removed from the reaction mixture by distillation in the form of a gaseous methanol/dimethyl carbonate mixture, in the course of which the pressure is reduced, at constant temperature $T_i$, from $^1p_i$ to a pressure $^2p_i$, and in the last substep $A_n$), the portion $x_n$ still absent from the total amount is added and the pressure $^2p_n$ at the end of the substep is atmospheric pressure; and
   B) reducing the pressure further until a pressure of $\leqq 100$ mbar has been attained, passing an inert gas stream into the reaction mixture, such that further methanol/dimethyl carbonate mixture is distilled off in parallel, and such that the temperature of the reaction mixture does not exceed 195° C.

2. The process according to claim 1, wherein the transesterification catalyst is ytterbium(III) acetylacetonate.

3. The process according to claim 1, wherein the transesterification catalyst is chosen from ytterbium(III) heptadionate, ytterbium(III) acetylacetonate and ytterbium(III) chloride.

4. The process according to claim 1, wherein the polyol component is 1,6-hexanediol.

5. The process according to claim 1, wherein the polyol component is chosen from 1,4-butanediol, 1,5-pentanediol, 1,6-hexanediol, 1,7-heptanediol, 1,12-dodecanediol, cyclohexanedimethanol, 3-methyl-1,5-pentanediol, 2,4-diethyl-1,5-pentanediol, trimethylolpropane, pentaerythritol, bis(2-hydroxyethyl) ether, bis(6-hydroxyhexyl) ether, diols prepared by reducing dimerized unsaturated fatty acids ("dimer diols"), short-chain $C_2$ or $C_3$ polyether diols having a number-average molecular weight of <500 g/mol, short-chain $C_4$ polyether diols having a number-average molecular weight of <700 g/mol and mixtures thereof.

* * * * *